A. N. ALTEN & O. DAVID.
BLOW VALVE FOR GAS WELLS.
APPLICATION FILED OCT. 1, 1910.

999,731.

Patented Aug. 8, 1911.
2 SHEETS—SHEET 1.

Witnesses

Alphonso N. Alten
Otto David
Inventors by Bonnhardt & Co
Attorneys

UNITED STATES PATENT OFFICE.

ALPHONSO N. ALTEN AND OTTO DAVID, OF AVON, OHIO.

BLOW-VALVE FOR GAS-WELLS.

999,731.

Specification of Letters Patent.

Patented Aug. 8, 1911.

Application filed October 1, 1910. Serial No. 584,827.

*To all whom it may concern:*

Be it known that we, ALPHONSO N. ALTEN and OTTO DAVID, citizens of the United States, residing at Avon, in the county of Lorain and State of Ohio, have invented certain new and useful Improvements in Blow-Valves for Gas-Wells, of which the following is a specification.

This invention relates to cleaners for gas wells, and embodies an improved form or construction of blow valve for the purpose of blowing out water, oil, or other heavy fluid from a gas well.

As is well known, gas wells often become "drowned out" by the collection therein of water or other liquid, and the object of the present invention is to utilize the gas pressure for the purpose of blowing out the collected liquid so as to afford free passage for the gas flow, which would otherwise be obstructed by the liquid. This object is effected by the use of a line of water pipe which is located or placed within the main tube of the well and which is provided at suitable distances apart with a series of valves which may be opened successively by turning the water pipe by means of a handle at the top, the construction being such that the valves will open in succession, the one nearest the top first, and so on down until all the water in the well is blown out through the water pipe.

The method of forcing water from gas wells by means of a blow valve is considered the most successful and commonly used, and one of the objects of the present invention is to provide a valve which can be readily opened or closed and which will avoid the troubles incident to the corrosion and sticking of known devices for the purpose.

Figure 1:
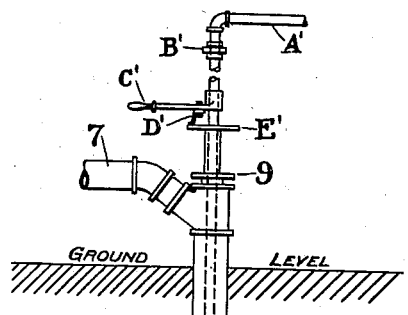
Figure 1:
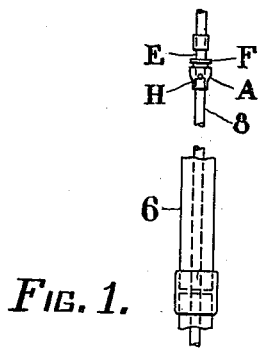
Figure 1:
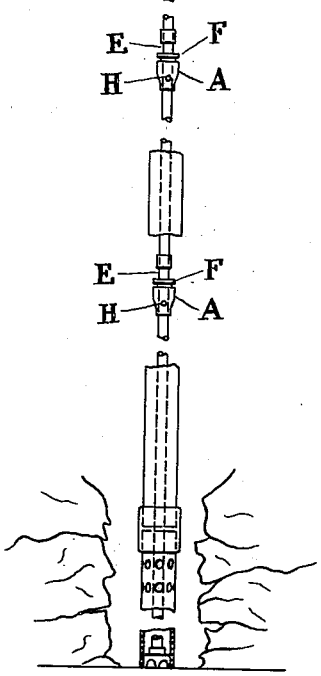
Figure 2:
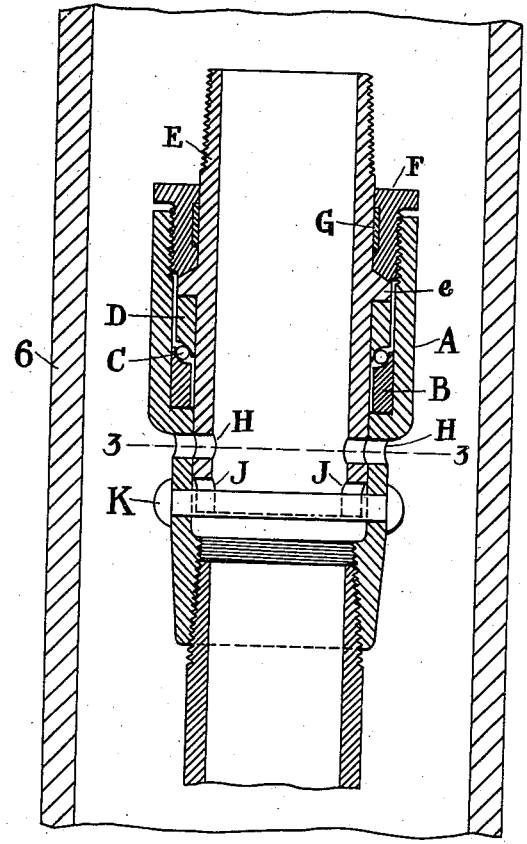
Figure 3:
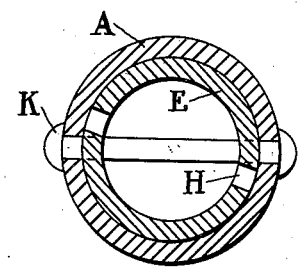
Figure 4:
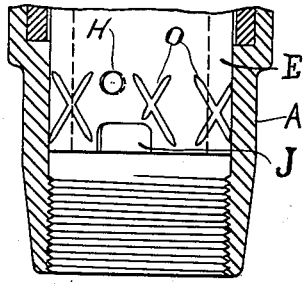
Figure 5:
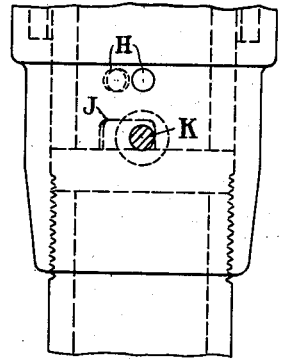
Figure 6:
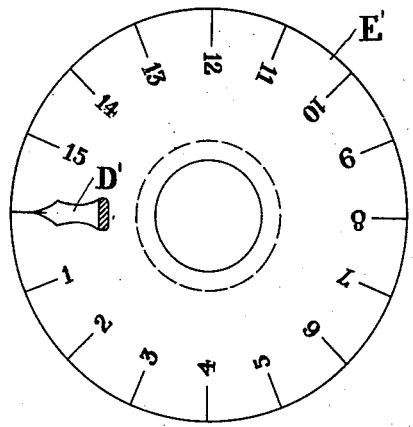
Figure 7:
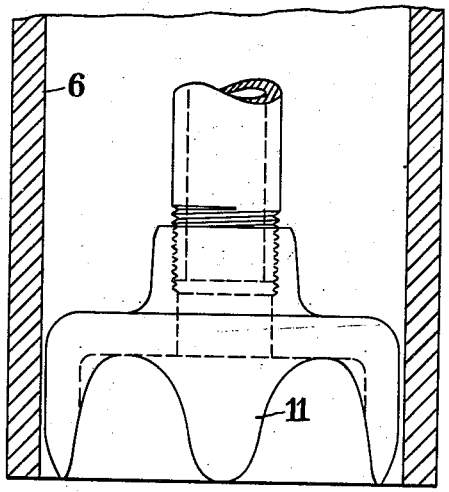

In the accompanying drawings—Figure 1 is an elevation, partly broken away, of a gas well provided with our device. Fig. 2 is a vertical section showing one of the valves. Fig. 3 is a section on the line 3—3 of Fig. 2. Figs. 4 and 5 are details in section and elevation of parts of the valve. Fig. 6 is a plan of the dial or indicator and Fig. 7 is a detail showing in elevation a device at the lower end of the water line for preventing turning thereof.

In the drawings, the main well tubing is indicated at 6. This is driven as usual to a depth of several hundred feet into the ground and is provided at the top with a suitable gas outlet or branch 7. The water line 8 consists of sections of pipe of much less diameter than the case pipe 6, and it extends at the top through a packer or gland 9 in the upper end of the gas tube, and is provided with an outlet bend A' connected to the water pipe by a turning joint at B'. The water line is equipped with a series of valves located at suitable distances apart, according to the pressure in the well. Each valve has a main outer casing A which carries a hardened steel ball race B, and the balls C bear against a ball race D which supports the inner tubular valve casing E, which has an external flange e against which the ball race D abuts. The inner valve casing E is threaded on its upper end for a coupling with the lower end of one of the pipe sections 8, and the lower end of casing A is threaded for connection to the upper end of the next pipe section below. The upper end of the outer casing A is threaded internally to receive a gland F which has a ground joint working on the inner casing E and is provided with a dry linen or other packing G which will expand when moistened, so as to make a close joint. By means of the gland F the sleeve E is forced down when the parts are assembled, carrying the ball race D to a close working bearing against the balls C. The outer casing A and the inner casing E are provided with holes H which register when the parts are turned to a certain position. A rivet K extends across the outer casing A, and is arched over by notches J in the lower end of the casing E, which notches are of proper size or width to allow the inner casing to turn just far enough to open and close the holes H. When the valve parts are assembled the ball race and all space between the casings will be filled with a heavy oil or grease, and the lower part of the sleeve E will be provided with lubricating grooves O, as shown in Fig. 4, which will assist in causing the valve to work easily and to prevent corrosion.

In Fig. 3 the pressure holes H are shown in closed position, and Fig. 5 shows the notches J permitting the movement of the inner casing to open or close the pressure holes. The upper end of the water pipe is provided with a handle C', and with a dial E', the handle carrying an index D' which shows on the dial the extent to which the pipe is turned.

In operation, when water or oil collects in the well the water pipe will be turned one space at a time by means of the handle, location of the holes H in the respective valves being such that when turned the first space the valve nearest the top is opened, and after the water above said valve is forced out by the gas pressure the pipe is turned the second space to open the second valve, and so on down until all the valves in the line are opened, and by reverse movement of the handle lever C' the valves are closed in succession. The lower section of the water line is prevented from turning by means of the pronged foot 11, the points of which engage in the ground. The ball bearings and effective lubrication of the valves permit the same to be opened or closed with little power and also serve to prevent sticking of the valves. It will be understood that the marks on the dial will be spaced apart a distance equal to the distance required to turn the pipe to open the valves in succession, that is, the width of the notches J, the sides of which, when the sections are turned, engage the rivets K in succession and thus the respective pipe sections are picked up and turned in succession.

The device will be found very effective in preventing the waste of gas incident to old devices for blowing out water and gas wells, and it will be appreciated that ease of operation is essential to efficient operation of a line of valves in a deep well.

The invention is not limited to the exact construction shown, but may be modified in various ways within the scope of the appended claims.

Having thus described our invention, what we claim as new and desire to secure by Letters Patent is:—

1. The combination of a pipe provided with a series of sections and blow valves connecting the same, said valves being constructed to open or close in succession as the pipe is turned, and means to indicate the extent of turn of the pipe and accordingly the number of valves opened.

2. The combination of a series of pipe sections and valves connecting the same, each valve having limited turning movement between its parts, said valve being adapted to open or close successively as the pipe sections are turned, and an indicator carried by one of the pipe sections, the marks on the indicator being related to the turning movement of the respective valves, to indicate the number of valves opened or closed.

3. A blow valve for gas wells, comprising inner and outer tubular casings arranged to turn one within the other and having openings which may be registered to open the valve, a gland in the upper end of the outer casing, through which gland the end of the inner casing extends, the casings being spaced from each other below said gland, forming a lubricant chamber, and bearings between the casings, in said chamber.

4. A blow valve for gas wells, comprising an outer tubular casing with a gland in the upper end thereof, and an inner tubular casing extending through said gland and arranged to turn on bearings in the outer casing, said inner casing having a shoulder against which the gland ring presses to hold the casings together, said casings having openings in the sides thereof which may be registered by turning the inner casing, and means between the casings to limit the turning movement of the inner casing.

5. A blow valve for gas wells, comprising inner and outer casings arranged to turn, one within the other, and having side openings which may be registered with each other, the end of the inner casing having notches, and a pin extending across the outer casing and through said notches, to limit the relative turn of the casings.

In testimony whereof, we do affix our signatures in presence of two witnesses.

ALPHONSO N. ALTEN.
OTTO DAVID.

Witnesses:
H. B. MARTINDALE,
C. T. WILFORD.